Patented Mar. 20, 1934

1,952,012

UNITED STATES PATENT OFFICE 1,952,012

GREASE AND METHOD OF LUBRICATION

Gus Kaufman, Port Arthur, Tex., assignor to The Texas Company, New York, N. Y., a corporation of Delaware No Drawing. Application July 12, 1930, Serial No. 467,626

6 Claims. (Cl. 87—9)

This invention relates to a grease which is insoluble in mineral oil and mineral oil in the presence of a reagent for treating the oil and to the method of lubricating moving parts with such grease.

In its broadest aspect the invention contemplates a lubricating grease, preferably comprising castor or ricinus oil and a metal ricinoleate, adapted to lubricate and seal the bearings of pumps or other related apparatus and which is substantially insoluble in, or inert towards, fluids handled by the pumping apparatus.

The invention further contemplates the method of lubricating and sealing moving parts in apparatus adapted to treating hydrocarbon oils with a reagent, which consists in applying to the moving parts a grease which is insoluble in the oil and the reagent to prevent loss of the oil or reagent with which it is being treated or both through the moving parts and to avoid contamination of the oil with the lubricant.

It is usually necessary in the operation of pumps, especially centrifugal pumps, for handling fluids to employ some suitable means of lubricating the bearing surfaces of the pump as well as to seal them and prevent leakage past their surfaces either outwardly of a small amount of the liquid which is being pumped, or inwardly of air which decreases the pumping efficiency and may at times cause the pump to lose suction entirely. Such means in the past have comprised the use of a lubricating composition such as ordinary cup grease or in some cases the circulation of a small portion of the main body of liquid, which is being pumped, through packing glands adjacent to the bearing surfaces.

Ordinary grease compositions may be unsatisfactory for lubricating and effectively sealing the bearings of pumps handling certain liquids due to the solvent effect, or tendency towards chemical affinity, which these liquids may exert upon such lubricating compositions, and incidentally resulting in excessively large consumption of the grease. Moreover, the escape of a small portion of the liquids between the bearing surfaces and adjacent packing glands as mentioned above may also be undesirable particularly when the liquid being pumped is of a volatile nature under the temperature conditions surrounding the exterior of the pump.

For example, in the treatment of mineral oil with liquid sulphur dioxide to remove sulphur and other undesirable constituents where it is frequently necessary to transfer streams of mineral oil, liquid sulphur dioxide, or mineral oil in admixture with sulphur dioxide from one part of the treating system to another with some sort of suitable pumping means it is extremely advantageous to employ a lubricant for the bearing surfaces of the pumps which is insoluble in the oil as well as resistant toward the action of sulphur dioxide and therefore sufficiently stable to remain effective as a sealing medium in order to prevent leakage and loss of oil or liquid sulfur dioxide or both, between the moving and stationary bearing surfaces of the pumping means.

The prevention of sulfur dioxide leakage is particularly desirable since it immediately volatilizes, upon escaping past the pump bearing surfaces or packing glands, and pollutes the surrounding atmosphere, rendering it obnoxious and unsafe for the operating personnel.

I have found that the grease compositions ordinarily available and which generally comprise mineral oil and fatty acid soap with varying amounts of water incorporated therewith are unsuitable for lubricating and sealing the bearings of pumps which are handling refined oils or liquid sulfur dioxide either alone or in admixture with the oil, since the mineral oil acts as a solvent upon such grease causing it to break down and therefore fail to effectively seal the bearings against leakage. In addition the sulphur dioxide readily combines with the water usually present in the grease to form sulfurous acid which corrodes the pump bearing surfaces extremely rapidly.

Furthermore the petroleum oil undergoing treatment may become contaminated to an appreciable extent, with portions of this grease due to its solvent effect upon the grease and which may tend to discolor the refined oil, or otherwise render it unsatisfactory due to the presence of this undesirable foreign material.

I have found that grease prepared from oils of the oxy-fatty series, particularly castor or ricinus oil, is particularly well suited to the lubrication and sealing of bearing surfaces of pumps which are handling refined or semi-refined oils especially when in admixture with sulfur dioxide or other more or less similar treating reagents. Relatively pure castor oil which may be composed almost entirely of triricinolein is substantially completely insoluble in mineral oil and at the same time is substantially inert towards sulfur dioxide. Altho castor oil as commercially available may include certain mineral oil soluble constituents such as stearic acid, tristearin or ricinoleic acid, the presence of these constituents in small amount does not materially effect the stability of a lubricating composition prepared from ordinary commercial castor oil.

Accordingly my invention comprises the preparation of a dehydrated grease which is substantially insoluble in mineral oil, free from water and resistant toward the action of sulfur dioxide, by partially saponifying castor oil with a metallic hydroxide, preferably an alkali metallic hydroxide, such as caustic soda to form a homogenous grease composition comprising castor oil in admixture with castor oil soap.

My invention therefore also comprises applying a grease having the foregoing characteristics to the moving parts of apparatus adapted to the treatment of hydrocarbon oils with a chemical reagent, to lubricate the moving parts and to prevent contamination of the oil undergoing treatment and loss of the oil or reagent from the system.

The soap content of the grease made according to my invention may vary from a fraction of a percent to as high as approximately 100 percent, in which case, the consistency of the resulting product will range from a semi or almost fluid state to a very hard cake like condition. Usually I prefer however, to carry out the saponification of the oil so as to prepare a product having a soap content which may range from about 10 percent to upwards of 50 percent by weight of the finished product and which may have a melting point of around 300° F.

The product made in accordance with my invention, may for example, possess physical characteristics of melting point and consistency substantially similar to those of ordinary cup greases but is distinctly different therefrom in that no water is incorporated therein with which sulfur dioxide may react to form a corrosive acid.

In preparing a batch of grease of the above nature I charge the castor oil to a conventional type of grease kettle and add thereto the desired amount of aqueous caustic solution, usually a solution containing 49 percent by weight of anhydrous sodium hydroxide. After mixing by stirring and agitating, the admixture may be heated to about 400° F. or a temperature above the melting point of the final product and maintained at this temperature for an appropriate period of time in order to complete the reaction as well as to drive off all of the water which was initially introduced to the kettle in the aqueous caustic solution and thereby produce a dehydrated grease. When the reaction is completed the resulting product may be drawn off in suitable pans to cool and solidify.

The following physical characteristics are typical of a product made in accordance with the foregoing procedure, when heating to about 400° F. from commercial grade castor oil and consisting approximately of 50 percent by weight of castor oil soap on the dry basis:

Melting point _____ 292° F.
Penetration (A. S. T. M. Penetrometer) __ 26

The grease may be prepared by heating the admixture of castor oil and caustic solution at a temperature lower than the melting point of the final product but preferably not lower than 250° F. in order to volatilize all the water. On the other hand it may also be prepared by first charging the castor oil to a conventional grease kettle in which it is heated to an elevated temperature, preferably above the melting point of the final product and at which temperature the desired amount of saponifying agent may be added, then maintaining the desired temperature to produce a reacted dehydrated and homogenous final product.

While the preparation of a grease containing a soda soap has been discussed it is contemplated that any metallic soap such as calcium soap or aluminum may be employed in the preparation of the grease. It is also contemplated that other fatty oil constituents, such as glycerine, which are insoluble in mineral oil may be incorporated in the product.

Obviously many modifications and variations of the invention, as hereinbefore set forth, may be made without departing from the spirit and scope thereof, and therefore, only such limitations should be imposed as are indicated in the appended claims.

I claim:

1. The method of lubricating apparatus used in the chemical treatment of hydrocarbon oils to effect efficient lubrication and to prevent solution of the lubricant and leakage of oil and chemicals from the system which comprises applying to the bearings and other surfaces requiring lubrication a lubricant substantially insoluble in the oil being treated, consisting essentially of castor oil and an anhydrous soap of castor.

2. The method of lubricating apparatus used in the chemical treatment of hydrocarbon oils to effect efficient lubrication and to prevent solution of the lubricant and leakage of oil and chemicals from the system which comprises applying to the bearings and other surfaces requiring lubrication a lubricant substantially insoluble in the oil being treated and in the chemical, consisting essentially of castor oil and an anhydrous alkali metal soap of castor oil.

3. The method of lubricating apparatus used in the treatment of hydrocarbon oils with sulfur dioxide to effect efficient lubrication and to prevent solution of the lubricant and leakage of liquids from the system and formation of corrosive acids by the sulfur dioxide which comprises maintaining on the bearings and other surfaces subjected to friction and susceptible to leakage a lubricant substantially insoluble in the oil and sulfur dioxide, consisting essentially of castor oil and the anhydrous soda soap of castor oil.

4. A lubricating grease comprising essentially a mixture of castor oil and the soda soap of castor oil, said grease being substantially anhydrous and substantially insoluble in mineral oil and sulphur dioxide.

5. A lubricating grease comprising essentially a mixture of castor oil and 10 to 50% of a soap of castor oil, said grease being substantially anhydrous and substantially insoluble in mineral oil and sulphur dioxide.

6. A lubricating grease comprising essentially a mixture of castor oil and an alkali metal soap of castor oil, said grease being substantially anhydrous and substantially insoluble in mineral oil and sulphur dioxide.

GUS KAUFMAN.